US008224606B2

(12) United States Patent
Leitch

(10) Patent No.: US 8,224,606 B2
(45) Date of Patent: Jul. 17, 2012

(54) MEASURING CLOCK JITTER

(75) Inventor: Adam Leitch, Brighton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 968 days.

(21) Appl. No.: 11/569,804

(22) PCT Filed: Jun. 2, 2005

(86) PCT No.: PCT/IB2005/051795
§ 371 (c)(1),
(2), (4) Date: Nov. 30, 2006

(87) PCT Pub. No.: WO2005/119379
PCT Pub. Date: Dec. 15, 2005

(65) Prior Publication Data
US 2009/0198467 A1 Aug. 6, 2009

(30) Foreign Application Priority Data

Jun. 4, 2004 (GB) .................................. 0412451.7

(51) Int. Cl.
*G01R 25/04* (2006.01)
(52) U.S. Cl. ................................ 702/89; 702/69; 702/79
(58) Field of Classification Search .................... 702/66, 702/67, 69, 71, 72, 79, 80, 89, 124, 125
See application file for complete search history.

(56) References Cited

U.S. PATENT DOCUMENTS

| 5,661,490 A * | 8/1997 | McEwan | 342/387 |
|---|---|---|---|
| 5,742,208 A * | 4/1998 | Blazo | 331/23 |
| 5,874,863 A * | 2/1999 | Wojewoda et al. | 331/17 |
| 5,889,435 A * | 3/1999 | Smith et al. | 331/1 A |
| 5,991,350 A * | 11/1999 | Yamamoto | 375/376 |
| 6,091,671 A | 7/2000 | Kattan | |
| 6,184,812 B1 * | 2/2001 | Younis et al. | 341/143 |
| 6,226,231 B1 | 5/2001 | Kattan | |
| 6,240,130 B1 | 5/2001 | Burns et al. | |
| 6,366,631 B1 | 4/2002 | Nakayama et al. | |

(Continued)

FOREIGN PATENT DOCUMENTS

WO WO 2004013971 A1 * 2/2004

OTHER PUBLICATIONS

International Search Report of International Application No. PCT/IB2005/051795 Contained in International Publication No. WO2005119379.

(Continued)

*Primary Examiner* — Jeffrey R West

(57) ABSTRACT

A device and method corrects time data based on a clock signal affected by jitter. The error due to jitter in a time measurement of an event in the clock signal is determined at the time of the event or as an average over a number of events. A measurement is made of a time dependent reference variable associated with a long-time constant device, such as a capacitor, which is relatively immune to localized jitter. The measurement may be a reading of the voltage across a charging capacitor. The measured value is compared to an expected value, and the time error is based on the result. The expected value may be stored or calculated from known charging rates of the capacitor. The error due to jitter of a time measurement is approximately linearly proportional to the difference in voltage between the measured and the expected values of the capacitor.

4 Claims, 8 Drawing Sheets

U.S. PATENT DOCUMENTS

| | | | | |
|---|---|---|---|---|
| 6,397,173 | B1 * | 5/2002 | Campbell et al. | 703/20 |
| 6,434,707 | B1 * | 8/2002 | Eklof | 713/500 |
| 6,528,982 | B1 * | 3/2003 | Yanagisawa et al. | 324/76.77 |
| 6,661,836 | B1 | 12/2003 | Dalal et al. | |
| 6,965,488 | B1 * | 11/2005 | Bennett | 360/75 |
| 7,450,593 | B2 * | 11/2008 | Miao | 370/395.62 |
| 2002/0103609 | A1 * | 8/2002 | Kuyel | 702/69 |
| 2002/0120880 | A1 | 8/2002 | Simon et al. | |
| 2003/0154065 | A1 | 8/2003 | Gauthier et al. | |

OTHER PUBLICATIONS

Written Opinion of the International Searching Authority for International Application No. PCT/IB2005/051795.

Xia et al: "On-Chip Short-Time Interval Measurement for High-Speed Signal Timing Characterization"; Proceedings of the 12th Asian Test Symposium (ATS '03) Nov. 16-19, 2003, pp. 326-331, XP010672507.

* cited by examiner

MEASURING CLOCK JITTER

The invention relates to a method and device for correcting for jitter in clock signals.

Jitter is broadly defined as a deviation between a real pulse and an ideal pulse, and can be a deviation in amplitude, phase, and/or pulse width. Jitter is typically formed from high frequency waveform variations caused by mechanical vibrations, supply voltage fluctuations, control-system instability and the like. Clock jitter can be defined as when a particular event in the clock's output varies-either leads or lags from the ideal timing of the particular event.

As the clock rates of electronic devices become higher and higher, the error in time measurements due to jitter become proportionally more significant. A number of situations exist wherein the jitter in clock signals causes significant errors. For example transceiver devices communicating with other devices in a wireless network using radio frequency signals may comprise a radio frequency front end and a digital back end and the jitter may cause errors in the interface between the rf front end and the digital back end. An analogue to digital converter is normally used to convert an analogue radio frequency signal to a digital signal and the digital signal is then compared to an expected signal to interpret the message. If the period of the clock signal used to convert the analogue signal varies due to jitter, there will be errors in the digital signal and there may be errors decoding the message.

An alternative situation when jitter causes significant errors in the functionality of a network is when determining the distances between devices in wireless networks. The distance between two nodes in a network may be determined by a first node sending a range request to a second node. The second node records the time the request arrived and returns a range response comprising time data including the time the request arrived and the time the response was transmitted. The first node receives the response and calculates the distance between the nodes based on the time stamps. If the time stamps are slightly inaccurate due to jitter, large errors in the calculated distance may result. Especially in low power radio frequency networks wherein the average distance between neighbouring devices is in the range of 1 to 10 m, jitter in the clock signal may cause errors of more than 1 m. When calculating distances between neighbouring devices, it is important that the time spent at the second node is as short as possible such that the clocks of the two devices do not have time to drift significantly. Consequently, a method of determining the time quickly and accurately is important.

The available methods of measuring jitter in clock signals are either very expensive or very slow and not suitable for correcting time measurements in the short time between the reception of a range request and the transmission of a range response.

A method and apparatus for measuring the jitter in a clock signal in an inexpensive way is disclosed in U.S. Pat. No. 6,240,130 to Burns et al. The method comprises measuring the sum of the collective jitter of a number of components comprising a clock for providing a clock signal, a sine wave generator, a sampling circuit and a digital signal processor. The jitter of an individual component can be accurately measured as long as the jitter of that component is substantially higher than that of the other components. Equations are disclosed for calculating the jitter as inversely proportional to the root mean square of the signal to noise ratio of each of a number of evenly spaced samples of the input signal. Consequently, a large number of samples are required to obtain an accurate value for the jitter. Consequently, the method is too slow to find the error due to jitter in a time measurement in the period of time it takes to measure the range between two nodes.

The invention seeks to solve the above problems.

It is an object of the invention to provide a method of estimating the error due to jitter in a time measurement based on a clock signal affected by jitter.

It is further an object of the invention to provide a way of correcting the time measurement such that the accuracy of processes and calculations based on the time measurement is improved.

According to the invention there is provided a method of improving the accuracy of a time measurement based on a clock signal affected by jitter, comprising determining the difference between a measured value of a time dependent reference variable at a first event in the clock signal and the expected value of said variable at the measured time data associated with said first event, and correcting said time measurement in dependence on said difference.

In one embodiment, in accordance with the invention, the time dependent reference variable is the voltage across a charging capacitor. The error due to jitter in the clock signal is linearly proportional to the difference between the measured voltage and the expected voltage.

According to the invention there is also provided an apparatus for improving the accuracy of a time measurement based on a clock signal affected by jitter, comprising a source for said clock signal, a reference device relatively immune to localised jitter, means for determining the difference between a measured value of a time dependent reference variable associated with said device at a first event in the clock signal and the expected value of said variable at the measured time data associated with said first event, and means for correcting said time measurement in dependence on said difference.

The expected value of the reference variable may be found from look-up tables stored in the memory of the device comprising the apparatus.

Embodiments of the present invention will now be described, by way of example, with reference to the accompanying drawings, in which.

Figure 1:
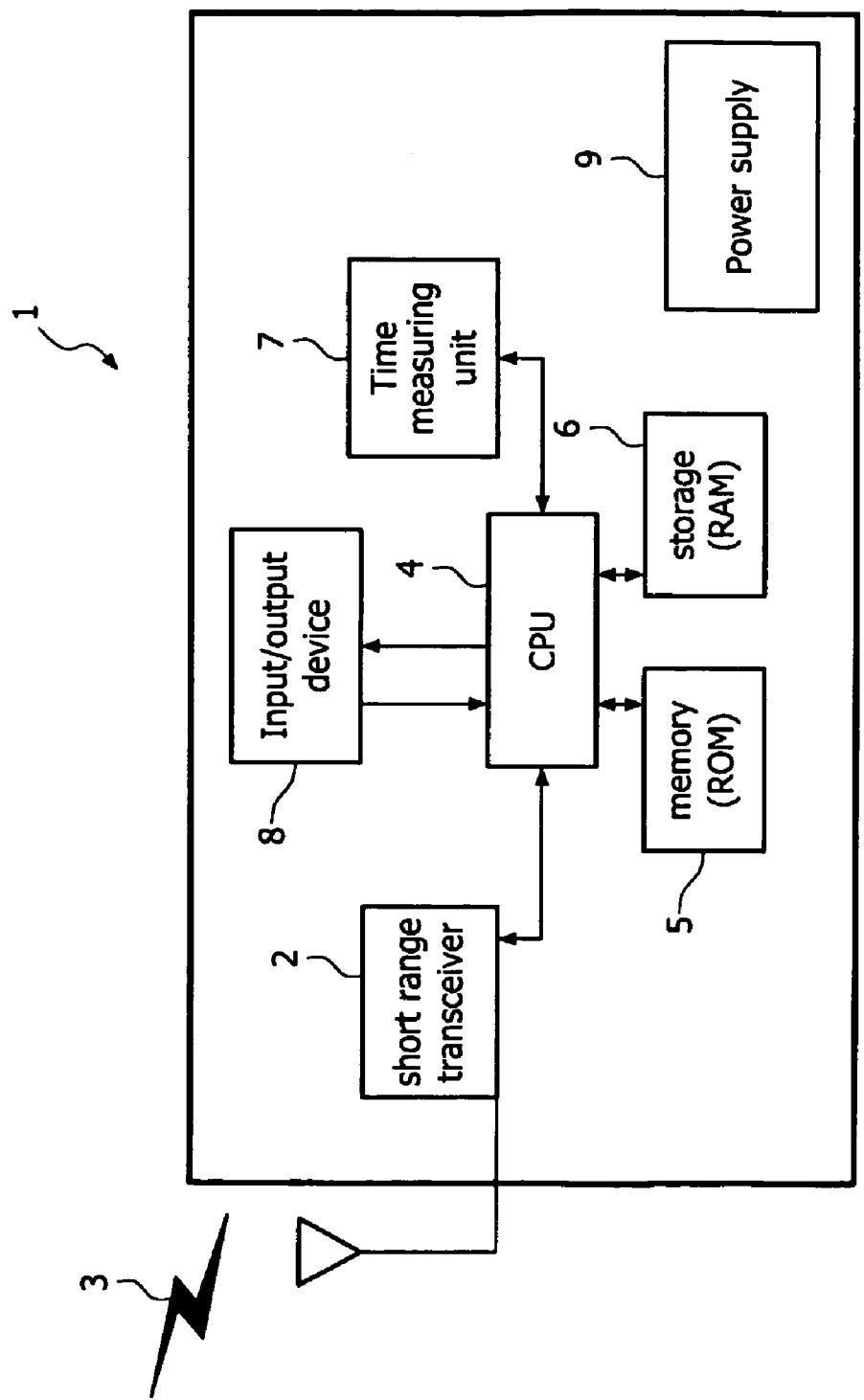
FIG. 1 is a schematic drawing of the components of a device in which the invention may be used.

Referring to FIG. 1, a device 1 communicating with other devices in a wireless network is shown. Device 1 comprises a short-range transceiver 2 for transmitting and receiving radio frequency signals 3, a central processing unit (CPU) 4, memory (ROM) 5, storage (RAM) 6 and a time measuring unit 7 for synchronising with other nodes and coordinating processes of the CPU 4. In one embodiment, device 1 further comprises input/output means 8 providing an interface to a user. The device is further connected to a power supply 9 which may comprise a battery.

Figure 2:
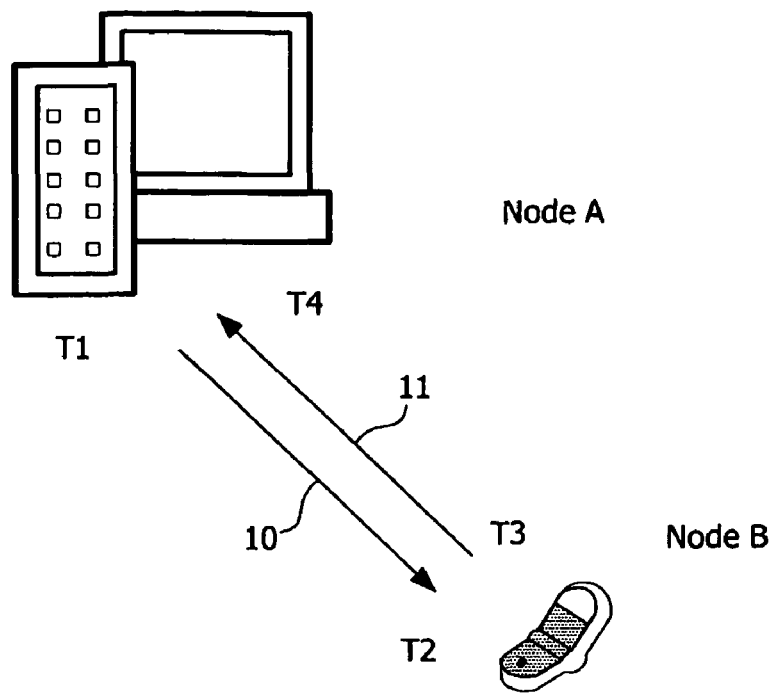
FIG. 2 is a schematic drawing of two nodes communicating in a wireless network.

In many wireless networks, it is important that records are kept about the distances between individual devices. These records need to be constantly updated. The records may be used to inform a user of the location of one of the devices or to find the quickest route between two devices, which are not within each other's communication range. FIG. 2 shows two nodes in a network, a desk top computer, node A, and a mobile phone, node B, in communication with each other. Each node is connected to/comprises a device 1. In order to find the distance to node B, node A sends a range request 10 to node B at time T1. Node B receives the request, notes the time T2 the request was received, prepares a response 11, sends the response comprising the time stamp T2 and the time T3 the response was transmitted. Node A receives the response at time T4 and calculates the distance between Node A and Node B by finding the time it took for the request to travel from node A to node B, $dT_{AB}$, and the time it took for the response to travel between node B and node A, $dT_{BA}$. By multiplying either one of $dT_{AB}$ or $dT_{BA}$ with the speed of light an approximate distance between nodes A and B can be found. However, it is likely that the clocks of node A and node B are slightly out of synchronisation. If there is a time delay between the two clocks, the error in $dT_{AB}$ will be equal in magnitude but of opposite sign to the error in $dT_{BA}$. Thus by calculating the average of $dT_{AB}$ and $dT_{BA}$, a more accurate value of the distance between node A and node B can be found. The distance between node A and node B is given by $$D=(dT_{AB}+dT_{BA})*c/2=(T2-T1+T4-T3)*c/2 \qquad (1)$$

where c is the speed of light.

The magnitude of the synchronisation error between the clocks can be calculated using equation 2.

$$Clock_{error}=(T2-T1-(T4-T3))/2 \qquad (2)$$

By finding the clock error, node B can further synchronise with respect to node A.

Figure 3:
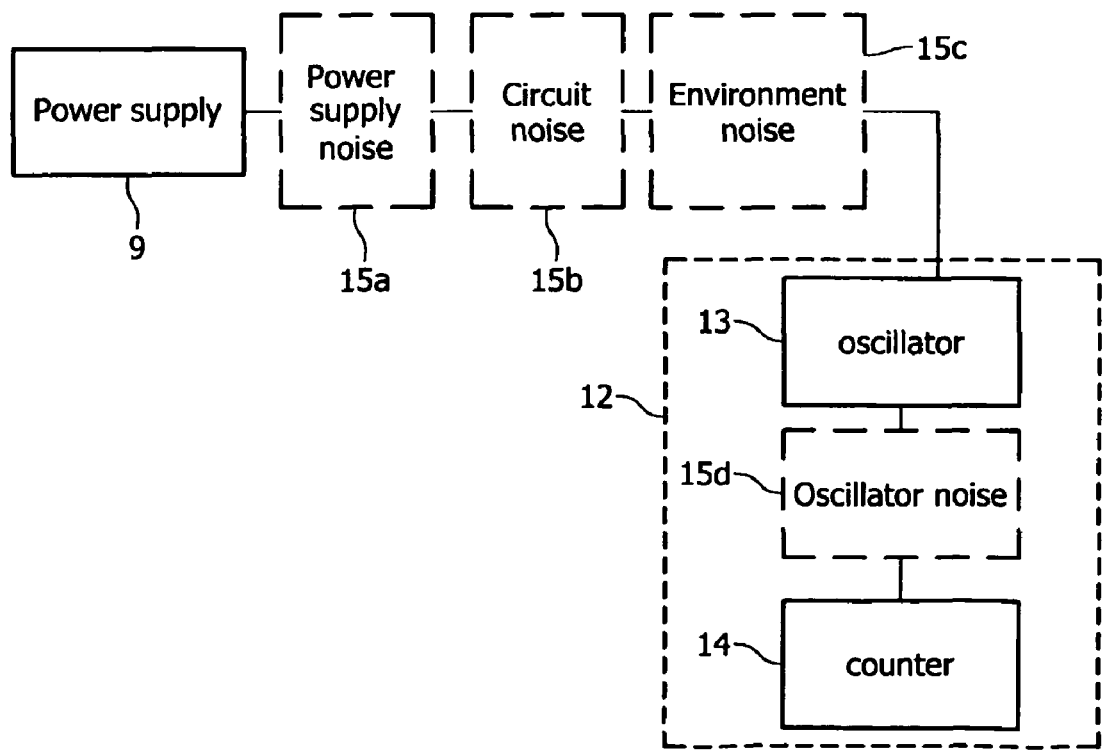
FIG. 3 illustrates the sources of jitter in a clock signal.

However, the synchronisation error is not the only potential error in the calculation that needs to be taken into account. The jitter affecting the clock signals of both nodes is not considered by the above equation. The jitter in the clock of node B may vary over the short period of time between the arrival of the request and the transmission of the response. Jitter may be due to fluctuations in the power supply, mechanical vibrations or an unequal supply of power to different components of the device. Thus, the calculated distance or the time delay between the clocks may not be accurate. In a typical device 1, the time measuring unit 7 usually comprises a clock 12 having a signal generator 13 in the form of an oscillator, and a counter 14 as shown in FIG. 3. The signal generator provides an oscillating signal having a constant time period and the counter keeps track of the time by counting the number of periods since a predetermined event. The signal generator needs a power supply to generate the signal and is connected to a power supply 9. In a typical short range low power transceiver in a wireless network the power supply may be a battery, the signal generator may be a crystal or a voltage controlled oscillator (VCO) and the counter may be made of software. The circuit connecting the components is affected by noise, which causes jitter in the clock signal. One source of jitter is the noise in the power supply 15a. The supply of power to the clock 12 may fluctuate depending on the age and the voltage of the battery 9 and on the number of input and output activities in the device 1. The circuit of the clock 12 itself may also be a source of jitter 15b. For example, jitter may be produced when the voltage signal to the clock couples electromagnetically to other signals in the circuit. An additional source of jitter is provided by the environmental noise 15c. Environmental noise may for example be produced by the mechanical interaction of the device or the temperature of the environment. The oscillating circuit 13 may also provide jitter 15d. Consequently, the signal supplied to the counter 14 is not an ideal signal with a constant period.

Figure 4:
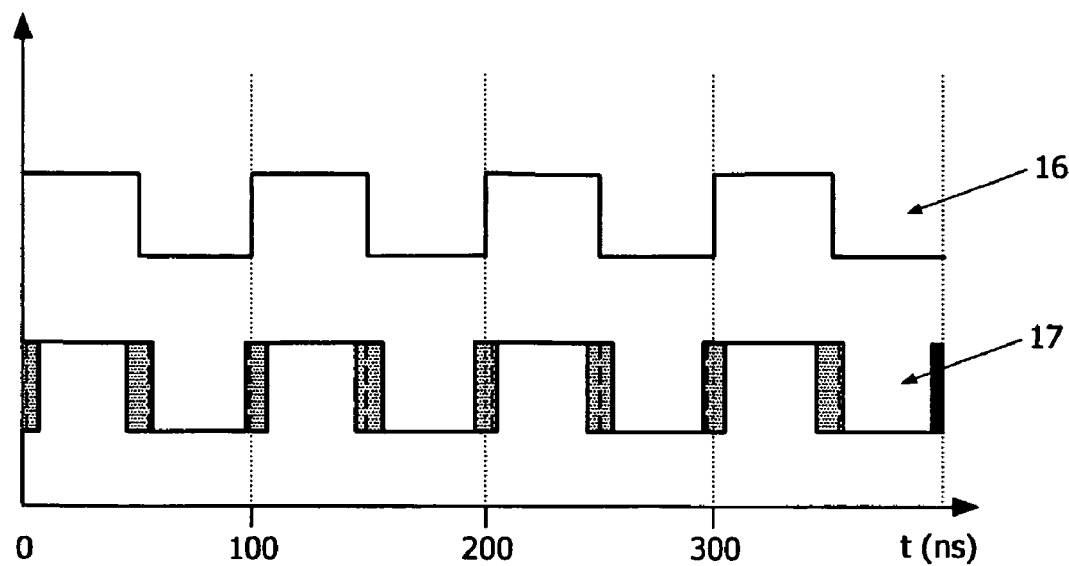
FIG. 4 illustrates the effect of jitter on a clock signal.

FIG. 4 shows the fluctuations of the oscillating signal. The ideal signal is shown by line 16 and a realistic signal affected by jitter is shown by the broken line 17. The grey areas indicate the possible time fluctuations of the rising and falling edges of the clock signal. A typical clock signal in a low power wireless network has a frequency of a few MHz resulting in a period of a few hundred nanoseconds. The ideal signal 16 in FIG. 4 shows a periodic signal having a frequency of 10 MHz equivalent to a period of 100 ns. Consequently, a noise level of a few percent results in an estimated error of a few nanoseconds. The realistic signal 17 has a noise level of approximately 5% of the period. Thus, a clock edge may arrive 5 ns ahead of its time. Considering that radio frequency signals move at approximately 1 meter per 3 nanoseconds, a 5 ns error may cause a significant error in the range measurement if the clock signal of FIG. 4 is used to determine the time of arrival of a range request between two devices 1. A five nanoseconds time error results in an error in the distance between node A and node B of over 1 m. This error is significant considering that the time of flight measurements may be measured in a network where the average distance between nodes is approximately 5 meters.

According to the invention, a component relatively immune to localised jitter can be used to estimate the error due to jitter on the time measurement and the estimate of the error can be used to correct the time measurement. One example of a device relatively immune to localised jitter is a capacitor that is charged by a separate, stable power source. The power supply noise affecting the clock signal will not have a significant effect on the charging capacitor. During the charging process, the capacitor voltage changes with time and so can be used as a parameter corresponding to the passage of time, which is jitter-free. According to the invention, this jitter-free time parameter is compared with the clock signal to measure its jitter so that a compensation for the jitter can be made.

Initially the capacitor is discharged and thereby reset. The charging of the capacitor is initiated at some point in time before a range request is received and a time measurement is needed. When the message is received, the value of the counter 14 is read and at the same time the voltage across the capacitor is read. The exact number of cycles since the capacitor was reset is known and consequently, the expected capacitor voltage can be calculated based on the waveform and periodicity of the ideal clock signal. If the actual value of the capacitor voltage is higher than the expected value, it is assumed that the jitter is causing the clock signal to lag an ideal clock signal. If the $n^{th}$ clock edge arrives at a time dt later than the $n^{th}$ clock edge of an ideal clock signal, the capacitor will have dt longer to charge before the voltage of the capacitor is read and consequently, the value of the capacitor voltage will be higher than expected at the time of detection of the $n^{th}$ clock edge. On the other hand, if the actual value of the capacitor voltage is lower than the expected value, the jitter is likely to have caused the clock signal to speed up such that the clock edge at the time of measurement arrived ahead of the ideal clock signal. During a sufficiently short period of time, the charging of the capacitor is approximately linear and consequently, the difference between the actual and the expected capacitor voltage value is directly proportional to the timing error caused by jitter.

Figure 5:
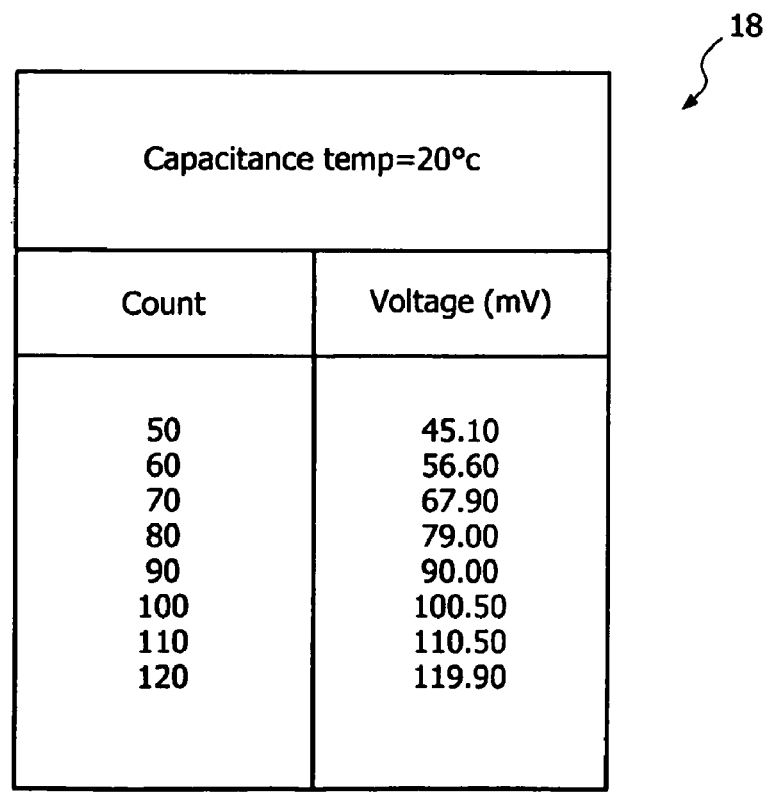
FIG. 5 illustrates a table of data stored in the memory of the device.

The expected voltage of the capacitor can be found by a number of different methods. For example, before manufacturing the device 1, the capacitor may be tested in laboratory conditions and look up tables recorded giving the expected voltage of the capacitor at regular intervals. A number of such tables may be stored in the memory of the device 1, wherein there may be different tables for different temperatures and different battery voltages. FIG. 5 shows an example of such a table 18 for a capacitor operating in laboratory conditions at a temperature of 20° C. The voltage of the capacitor when being charged under predetermined conditions may be sampled using a very accurate clock, which generates a clock signal with a period of 10 ms. The value of the capacitor voltage is recorded every $10^{th}$ count, i.e. every 100 ms. The table is then stored in the memory 6 of a device 1. During the operation of device 1, the counter 14 in the device is read at the $85^{th}$ count or at 0.85 s after the reset of the capacitor voltage. The voltage of the capacitor is read at the same time. There is no expected value in the table for the $85^{th}$ count. However, there are recorded values for the $80^{th}$ and $90^{th}$ count. According to the table, the voltage of the capacitor increased by 11.00 mV between the $80^{th}$ and $90^{th}$ count which is approximately 1.10 mV per cycle of the clock signal, assuming that the voltage level of the capacitor increases approximately linearly with time. Thus, the voltage across the capacitor at the $85^{th}$ count is likely to have been 84.50 mV. In this example the actual value was 86.04 mV. Consequently, the actual value of the capacitor is 1.50 mV higher than the expected value. Considering that the capacitor, in this example, charges by approximately 1.10 mV per cycle, the capacitor was allowed to charge for 1.54/1.10=1.4 clock periods longer than expected, i.e. the $85^{th}$ clock edge lagged the ideal timing by 1.4 periods or 14 ms. In an alternative embodiment of the table 18 in FIG. 5, values of the capacitor voltage may be recorded at each interval corresponding to the period of the clock signal. The clock signal in the above example has a relatively low frequency. The value of the frequency in this example is only illustrative and should not be interpreted as restricting the scope of the invention.

In another embodiment, the time measuring unit 7 may automatically update the expected capacitor voltage table. For example, during a period of time when the processing activity of the device is low and the jitter in the clock signal may be reduced, circuitry may be provided to take a series of measurements of the capacitor voltage and store them in the table. Alternatively, the table may be updated every time the battery is changed, every time device 1 is moved or at predetermined regular intervals.

Another way of knowing the expected value of the capacitor is to find an equation for how the voltage changes with time. The rate of charging of the capacitor can be found from the specification of a particular capacitor, values recorded in lab conditions or values recorded during normal operation of the device comprising the capacitor. The expected value of the capacitor voltage can then be calculated. If the capacitor is only allowed to charge for a very short time, the voltage level increases approximately linearly with time. For example, if laboratory conditions show that the capacitor has a charging rate of 100.00 mV per second at a specific temperature and the clock of the device 1 has a clock signal with a frequency of 100 Hz, it can easily be calculated that the expected voltage of the capacitor at the end of the $105^{th}$ period of the clock is 105.00 mV. If the actual value of the capacitor is 104.20 mV, the end of the $105^{th}$ period of the clock signal can be assumed to have arrived 8 milliseconds to early, i.e. at 1042 ms and not 1050 ms.

Figure 6:
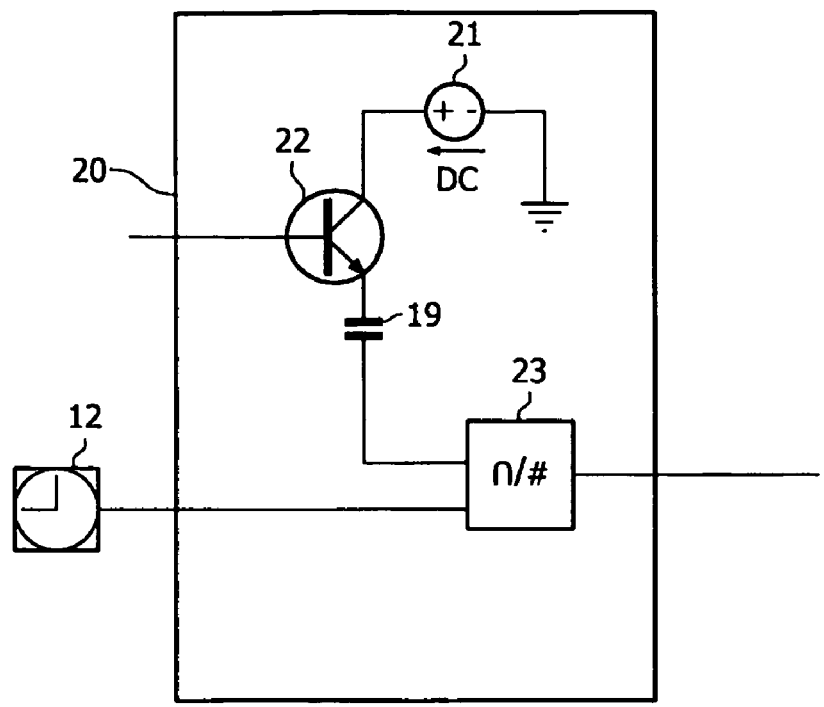
FIG. 6 shows a circuit connecting a long-time constant device relatively immune to localised jitter according to one embodiment of the invention.

FIG. 6 shows a specific example of a capacitor 19 used for estimating jitter, connected in a circuit 20 according to one embodiment of the invention. The capacitor is connected to a current source 21 via a gate 22 which may be a field effect transistor. The current source is further connected to ground. The charging of the capacitor 19 is initiated at some point before an accurate time measurement is needed by applying a voltage onto gate 22 such that current from the current source 21 is allowed through the gate to the capacitor 19. The CPU 4 of the device may control when the gate 22 is opened and when it is closed. An analogue to digital converter (ADC) 23 is used to digitally sample the capacitor voltage. The intervals between the times at which the samples are taken are regulated by the clock signal supplied from the clock 12. The voltage of the capacitor may be read at each rising or falling edge of the clock signal. Alternatively, the voltage may be read every $n^{th}$ edge of the clock signal. The ADC is further connected to a unit that stores a series of values of the capacitor voltage (not shown in FIG. 6). The exact number of counts from the time the gate 22 opened is known and consequently, there is an expected voltage level of the capacitor, which can be compared with the actual value to estimate the jitter, as explained in more detail hereinafter.

Figure 7:
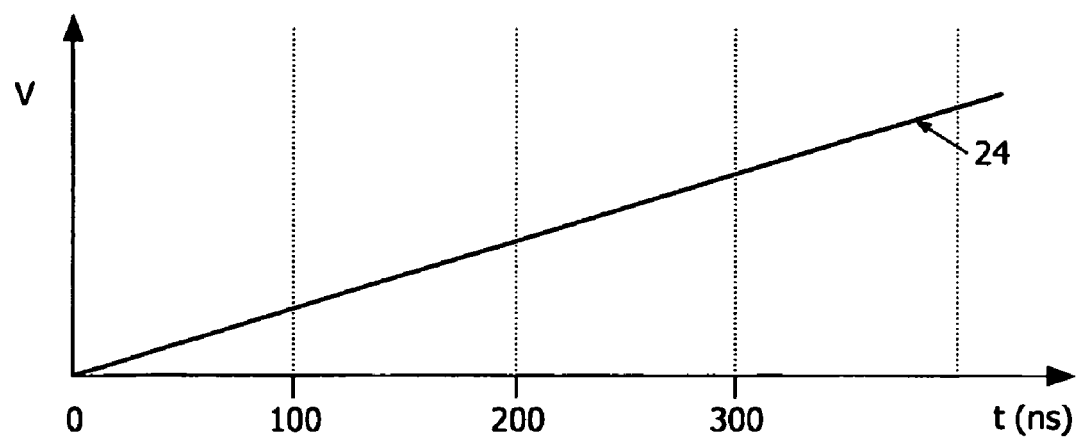
FIG. 7 is graph illustrating the voltage levels of a charging capacitor according to one embodiment of the invention.
Figure 8:
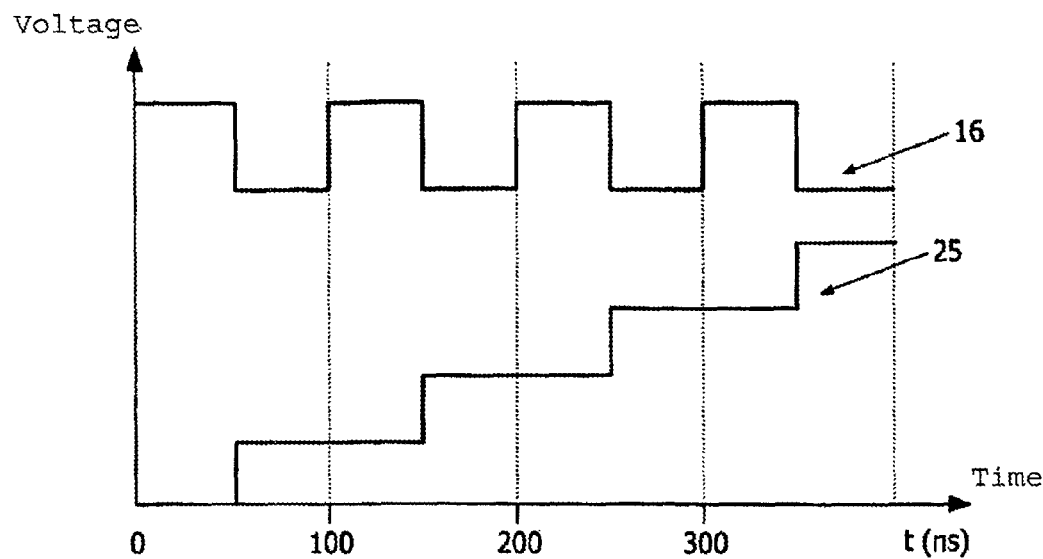
FIG. 8 is a graph illustrating the sampled voltage values of a capacitor using an ideal clock signal.
Figure 9:
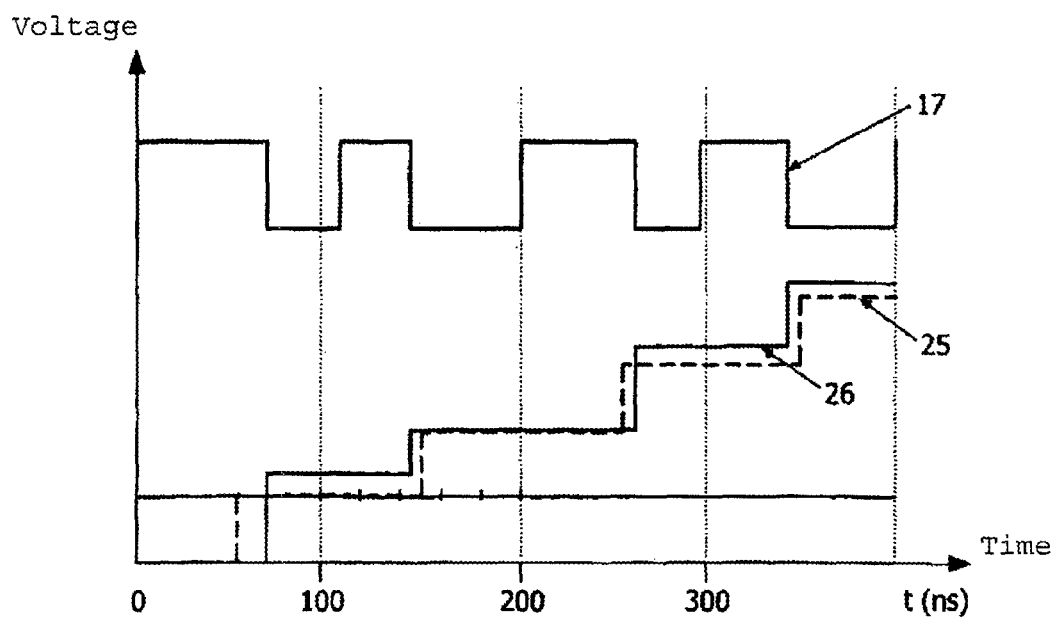
FIG. 9 is a graph illustrating the sampled values of a capacitor using a clock signal affected by jitter.

FIG. 7 shows the voltage level of the capacitor during a short period of time in which the gate 22 is open. The voltage 24 across the capacitor increases approximately linearly with time if the period of time is small enough, thus providing a substantially linear time dependent parameter, which is free of jitter. FIG. 8 shows the output of the ADC 23 when an ideal clock 12, unaffected by jitter is used in the circuit 20. The ideal clock signal 16 has a period of 100 ns in this example. The vertical broken lines illustrate the period of the regular signal. The voltage of the capacitor is sampled by the ADC 23 on every falling edge of the clock signal, corresponding to every $100^{th}$ nanosecond. Consequently, the voltage level 25 of the capacitor when the ADC is connected to an ideal clock appears to increase in perfect incremental steps. The sampled voltages may be saved in a look up table 18. FIG. 9 shows the voltage level 26 of the capacitor when a clock signal 17 affected by jitter is fed into the ADC 23. The incremental steps of the sampled voltage vary with time. If the jitter causes a period of the clock signal to be longer than expected, the capacitor is left to charge for a longer time between two readings than expected resulting in a large measured voltage increase across the capacitor. If a period of the signal 17 is shorter than the expected period, the period between two readings is shorter than expected and the voltage of the capacitor increases by a smaller than expected amount. The voltage levels measured with the ideal sampling rate, i.e. equivalent to the expected capacitor voltage, is shown in a broken line 25, superimposed on line 26. A comparison of waveform 25 and waveform 26 shows that at 120 ns the actual value of the capacitor is higher than the expected value of the capacitor. That implies that the falling edge of the clock signal in the first period shown, arrived late due to jitter. This is also confirmed by clock signal 17. Thus, the jitter can be estimated by comparing the sampled values of the capacitor voltage (corresponding to waveform 26) and the expected value of the capacitor voltage (corresponding to waveform 25), saved in table 18. The expected values of waveform 25 can be interpolated to estimate at what time the clock edge of the actual clock signal 17 arrived compared to the ideal clock signal 16. In order to obtain increased accuracy, the difference between the actual and the expected voltage the voltage level between two readings may be obtained by extrapolating between two readings.

Figure 10:
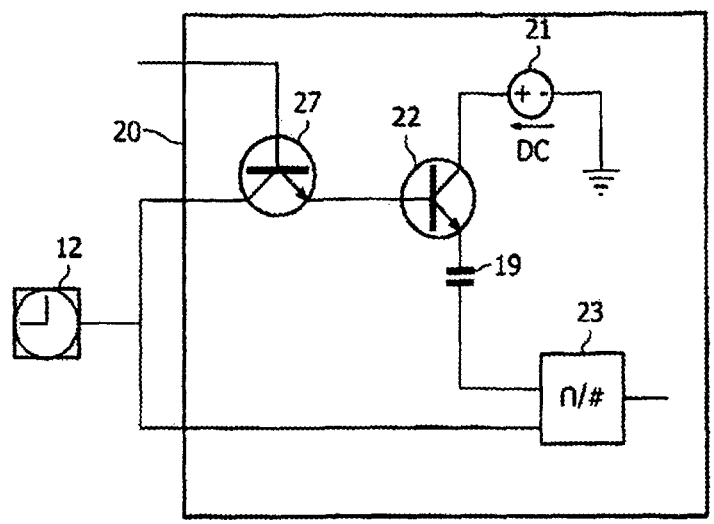
FIG. 10 shows a circuit connecting a long-time constant device relatively immune to localised jitter according to a second embodiment of the invention.
Figure 11:
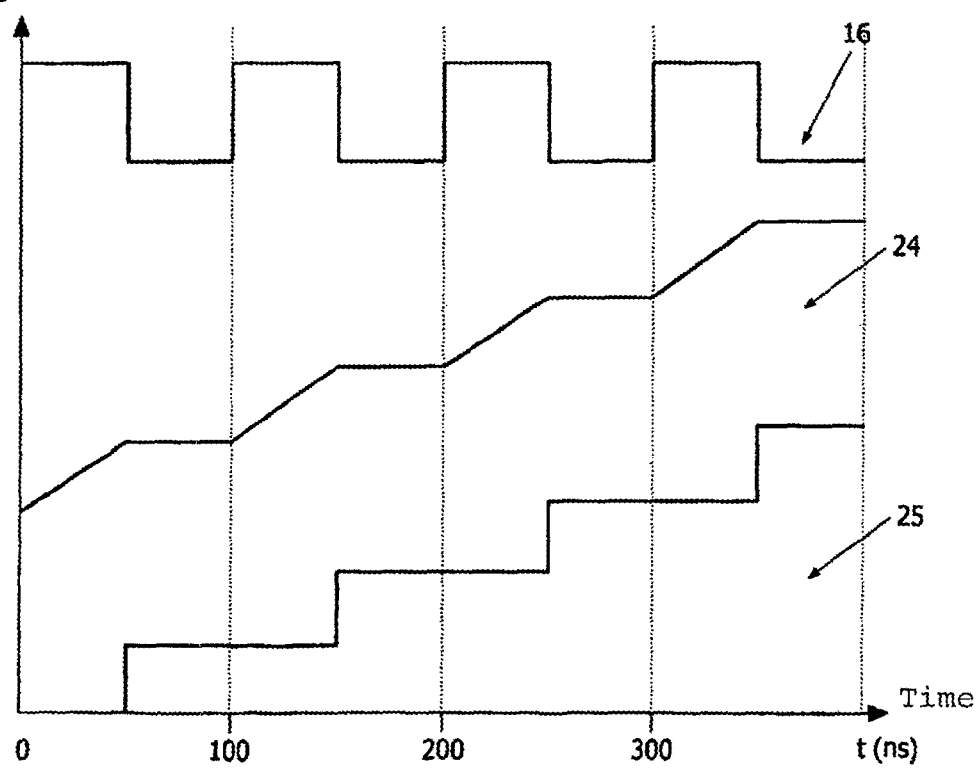
FIG. 11 is a graph illustrating the voltage of a charging capacitor according to a second embodiment of the invention and the sampled voltage of the capacitor using an ideal clock signal.
Figure 12:
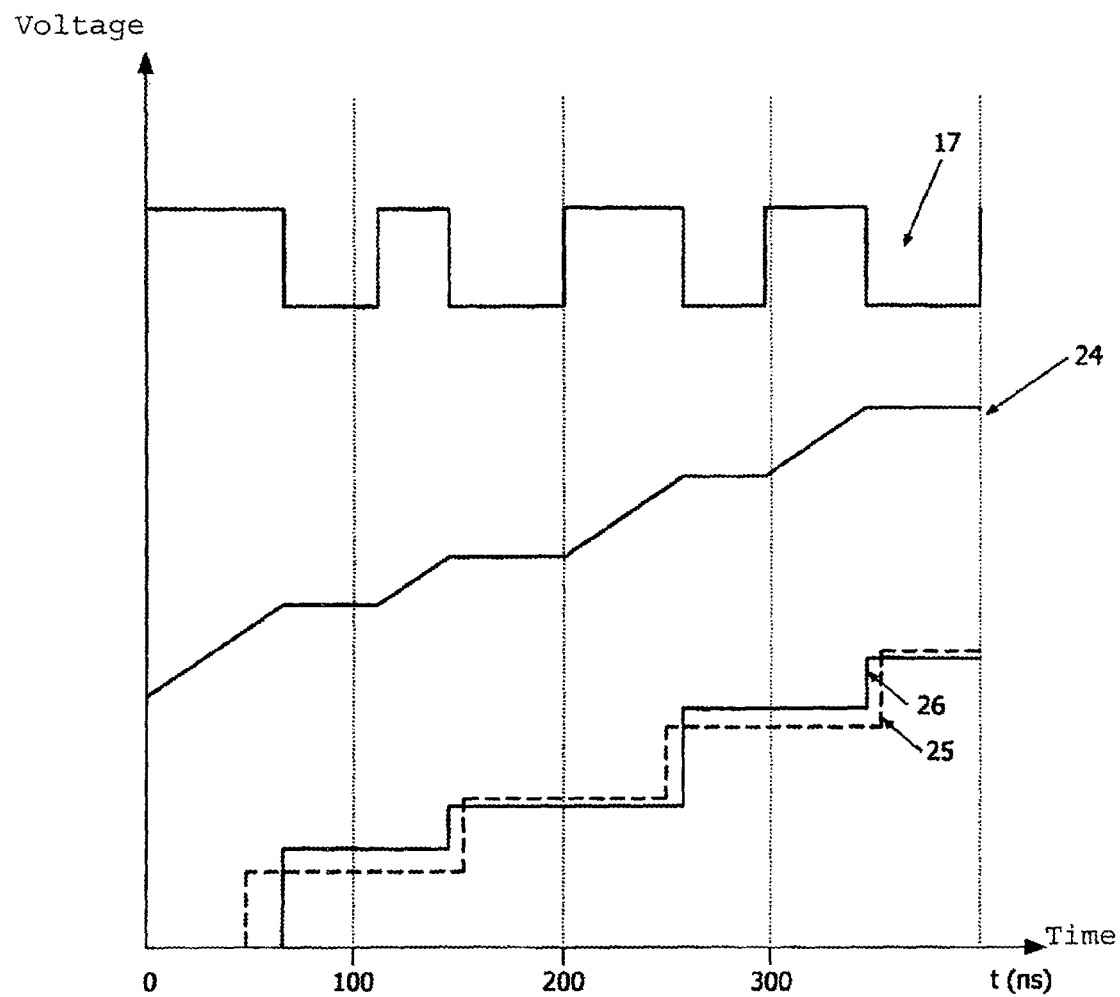
FIG. 12 is a graph illustrating the voltage of a charging capacitor according to the second embodiment of the invention and the sampled voltage of the capacitor using a clock signal affected by jitter.

FIG. 10 shows another embodiment of a circuit comprising the capacitor 19 according to the invention. The difference between this circuit and the one shown in FIG. 6, is that the charging of the capacitor is controlled by the clock signal 12. Instead of opening the gate 22 and charging the capacitor continuously for a period of time, the capacitor is only allowed to charge for half the period of each period of the clock signal. The circuit comprises an additional gate 27. A voltage is applied to gate 27 during the whole time period in which a time measurement is expected. The capacitor may be reset at regular intervals. When a voltage is applied to gate 27 the clock signal is fed to gate 22 resulting in that current from the current source 21 is allowed to pass to the capacitor 19 when the voltage of the clock signal is positive, i.e. during half the period. An ADC is used to sample the voltage of the capacitor at regular intervals as explained with reference to FIG. 6. When the clock signal fed to gate 22 is unaffected by noise as shown by line 16 in FIG. 11 the capacitor charges according to line 24 of FIG. 11. When current is let through the gate, the capacitor charges approximately linearly and when the gate is closed the voltage remains constant. The output from the ADC is shown by line 25 in FIG. 11. The voltage level increases in regular incremental steps. However, when the clock signal applied to gate 22 is affected by jitter as shown by line 17 in FIG. 12, the charging of the capacitor is irregular. If the clock signal comprises an unusually long period, gate 22 is open for a longer time than expected and the capacitor charges more than expected. On the other hand, if the jitter causes a period to be unusually short, the capacitor will not charge as much as expected. Line 26 shows the sampled voltage of the capacitor when the clock signal is affected by jitter. The sampled rate of voltage increase of the capacitor for an ideal clock signal 25 is shown with a broken line. By comparing line 25 and 26 is it clear that the difference between the voltage level of a capacitor charging according to an ideal clock signal and the voltage level of a capacitor charging according to a realistic clock signal corresponds to the difference in the timing of edges of the ideal and realistic clock signal. Thus, the jitter can be estimated as previously described with reference to FIG. 9, by comparing the data corresponding to the idealised clock waveform derived from the database table 18 of FIG. 5, with that of an actual clock waveform 26 derived by sampling the capacitor voltage.

Figure 13:
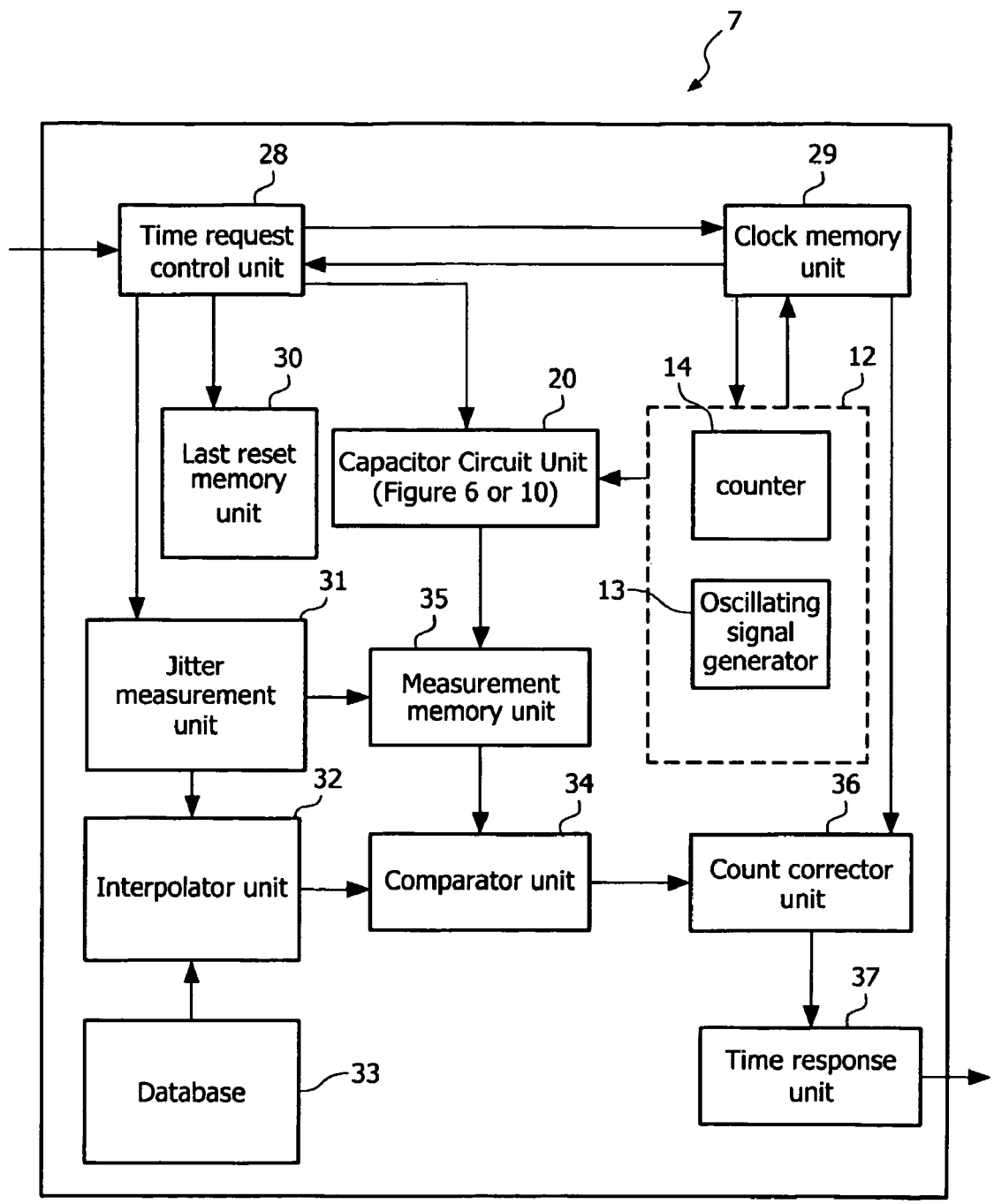
FIG. 13 is a schematic functional block diagram of a time measuring unit in accordance with the invention.

FIG. 13 is a functional block diagram of the time measuring unit 7 of device 1 according to the invention. It comprises a time request control unit 28, a clock memory unit 29, a clock 12, a last reset memory unit 30, a capacitor circuit unit 20, a jitter measuring unit 31, an interpolator unit 32, a database 33, a comparator unit 34, a measurement memory unit 35, a count corrector unit 36 and a time response unit 37. In one embodiment, the capacitor circuit unit 20 comprises the circuit of FIG. 6. In another embodiment, the capacitor circuit unit comprises the circuit of FIG. 10. According to one embodiment of the invention, at some point before a time measurement is needed the CPU 4 of device 1 sends a request to the time request control unit 28 to prepare for time measurements. The time request control unit 28 sends a request for a reading of the counter 14 to the clock memory unit 29. Simultaneously it applies a voltage step to the gate of the low jitter circuit 20 such that the capacitor starts charging. In the embodiment of FIG. 6 the step voltage is applied to gate 22 of the circuit and the current is fed through gate 22 for as long as the voltage is applied. In the embodiment of the capacitor circuit shown in FIG. 10, the step voltage is applied to gate 27, which in turn allows the clock signal to be fed through gate 22 to the capacitor. The clock memory unit 29 sends the value of the counter 14 to the time request control unit 28. The counter reading is saved in the last reset memory unit 30. At some time later the CPU sends another request to the time request control unit asking for the time. The time request control unit 28 subsequently sends another message to the clock memory unit 29, which in turn saves the last current value of the counter 14 and returns the value to the time request control unit. The time request control unit calculates the number of counts between the last reset of the capacitor and the current count of the clock by subtracting the count reading of the last reset memory unit from the new reading.

The thereby calculated number of cycles since the last reset of the capacitor is forwarded to the jitter-measuring unit 31. The jitter-measuring unit sends a request to the interpolator unit 32 to find the expected value of the capacitor voltage based on the calculated count value i.e. using data corresponding to the table shown in FIG. 5. The interpolator unit looks up values in the look up tables in the database and interpolates the values to find the expected value of the capacitor voltage (based on an idealised clock waveform). The expected value of the capacitor is forwarded to the comparator unit 34. At the same time the measurement memory unit 35 that records the output from the ADC is instructed by the jitter measurement unit 31 to send the actual digital value of the sampled capacitor voltage to the comparator unit 34. The comparator unit calculates the difference between the actual and the expected value of the capacitor voltage and forwards the difference to the count corrector unit 36. The count corrector unit 36 receives the measured time data from the clock memory unit 29, converts the difference between the actual and the expected capacitor voltage data into a corresponding time error and corrects the time data for the jitter. The corrected count is forwarded to the time response unit 37, which converts the count into time units and forwards the time measurement to the CPU 4.

The circuits above have been described for clock signals of 100 Hz or 10 MHz per second. However, by using frequency multipliers clock signals can be generated that are able to time events to the nearest nanosecond. Moreover, the error in the clock signal can be determined every 100 ns such that it can be found whether the clock signal leads or lags an ideal clock signal. Thus, the average time difference due to jitter over a number of period can be found and the time data corrected. Consequently, distances between nodes in a wireless network can be determined more accurately. The higher the frequency of the capacitor readings, the higher the accuracy of the estimated error due to jitter. Moreover, the jitter in the clock signal may not necessarily have to be measured at the exact time of the transmission or reception of a message. The jitter may be measured at a number of events before or after the event to be timed and an average, approximate value for the jitter can be calculated.

It should be evident to the skilled reader that the capacitor can be replaced by any other suitable device that is relatively immune to jitter. Moreover, the invention is not restricted to the circuits and devices shown in the drawings. Additionally, the invention can be used for other purposes than to accurately determine the time of a range response or range request. For example, internal processes like digital processing in the device, clock synchronisation between devices or accurate allocation of time slots to slave devices in a master slave network are all examples of situations in which the invention may be used.

Furthermore, not every device in a wireless network needs to have the time correcting apparatus as described above. For example, in a master/slave network, the slave nodes are usually smaller and cheaper and are therefore more influenced by the external temperature, mechanical vibration and battery voltages resulting in increased jitter in the clocks. Moreover, the clocks may be of a lower quality. It may then be preferential to have the time measuring unit according to the invention at the slave node.

Alternatively, if the cost and processing power of the time measuring unit is an issue, one time measuring unit in accordance with the invention may be placed in the master node and the slave nodes may repetitively synchronise with respect to the master node.

Although Claims have been formulated in this Application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any Claim and whether or not it mitigates any or all of the same technical problems as does the present invention. The Applicants hereby give notice that new Claims may be formulated to such features and/or combinations of such features during the prosecution of the present Application or of any further Application derived therefrom.

The invention claimed is:

1. An apparatus for correcting a time measurement based on a clock signal affected by jitter, the apparatus comprising:
   a source for said clock signal;
   a reference device relatively immune to localized jitter for providing a time dependent reference variable;
   a measuring unit for measuring the time measurement and a measured value of the time dependent reference variable after allowing the time dependent reference variable to increase for a duration that includes a first number of clock cycles terminated at a first event;
   a memory for storing data about expected values of the time dependent reference variable at various durations including various numbers of clock cycles, wherein the measuring unit updates the expected values;
   a comparator for determining a difference between the measured value of the time dependent reference variable and an updated expected value of said time dependent reference variable obtained from the updated expected values;
   a correction unit for correcting said time measurement in dependence on said difference, wherein the reference device comprises a charging capacitor and wherein the time-dependent reference variable is a voltage across the charging capacitor, the charging capacitor having a time constant that allows the charging capacitor to charge for the duration so that the voltage across the charging capacitor increases approximately linearly with time; and
   a first gate which is opened for the duration to pass the clock signal, and a second gate which is opened by the clock signal passing through the first gate to allow charging of the charging capacitor for the duration during half periods of the clock signal.

2. The apparatus of claim 1, further comprising an analogue to digital converter connected to the clock signal and the charging capacitor for sampling the voltage across the charging capacitor at intervals that are regulated by the clock signal.

3. A method of correcting a time measurement of a device based on a clock signal affected by jitter, the method comprising acts of:
   measuring said time measurement;
   measuring a measured value of a time dependent reference variable after allowing the time dependent reference variable to increase for a duration that includes a first number of clock cycles terminated at a first event, wherein the time-dependent reference variable is a voltage across a charging capacitor, the charging capacitor having a time constant that allows the charging capacitor to charge for the duration so that the voltage across the charging capacitor increases approximately linearly with time;
   updating an expected value of the time dependent reference variable associated with the duration of the first number of clock cycles;
   retrieving the updated expected value;
   determining a difference between the measured value of the time dependent reference variable and the updated expected value of said time dependent reference variable using a comparator;
   correcting said time measurement in dependence on said difference;
   opening a first gate for the duration to pass the clock signal; and
   opening a second gate which is opened by the clock signal passing through the first gate to allow charging of the charging capacitor for the duration during half periods of the clock signal.

4. A non-transitory computer readable medium embodied with instructions when executed by a processor are configured for correcting a time measurement of a device based on a clock signal affected by jitter by performing acts of:
   measuring said time measurement;
   measuring a measured value of a time dependent reference variable after allowing the time dependent reference variable to increase for a duration that includes a first number of clock cycles terminated at a first event, wherein the time-dependent reference variable is a voltage across a charging capacitor, the charging capacitor having a time constant that allows the charging capacitor to charge for the duration so that the voltage across the charging capacitor increases approximately linearly with time;
   updating an expected value of the time dependent reference variable associated with the duration of the first number of clock cycles;
   retrieving the updated expected value;
   determining a difference between the measured value of the time dependent reference variable and the updated expected value of said time dependent reference variable;
   correcting said time measurement in dependence on said difference;
   opening a first gate for the duration to pass the clock signal; and
   opening a second gate which is opened by the clock signal passing through the first gate to allow charging of the charging capacitor for the duration during half periods of the clock signal.

* * * * *